US006975672B2

(12) United States Patent
Bottomley et al.

(10) Patent No.: US 6,975,672 B2
(45) Date of Patent: Dec. 13, 2005

(54) APPARATUS AND METHODS FOR INTERSYMBOL INTERFERENCE COMPENSATION IN SPREAD SPECTRUM COMMUNICATIONS

(75) Inventors: Gregory Edward Bottomley, Cary, NC (US); Tony Ottosson, Morrisville, NC (US); Yi-Pin Eric Wang, Cary, NC (US)

(73) Assignee: Ericsson Inc., Plano, TX (US)

( * ) Notice: Subject to any disclaimer, the term of this patent is extended or adjusted under 35 U.S.C. 154(b) by 1000 days.

(21) Appl. No.: 09/756,504

(22) Filed: Jan. 8, 2001

(65) Prior Publication Data

US 2002/0141486 A1 Oct. 3, 2002

(51) Int. Cl.[7] .......... H04B 1/69
(52) U.S. Cl. .......... 375/148; 375/130
(58) Field of Search .......... 375/148, 130, 375/150, 144, 316, 348, 346; 570/342, 335, 570/320, 441

(56) References Cited

U.S. PATENT DOCUMENTS

| | | | | |
|---|---|---|---|---|
| 5,483,557 | A | 1/1996 | Webb | 375/349 |
| 5,889,827 | A | 3/1999 | Bottomley et al. | 375/350 |
| 5,966,415 | A | 10/1999 | Bliss et al. | 375/350 |
| 6,148,023 | A | 11/2000 | Pelin et al. | 375/206 |
| 6,363,104 | B1 * | 3/2002 | Bottomley | 375/148 |
| 6,574,270 | B1 * | 6/2003 | Madkour et al. | 375/148 |
| 2002/0101908 | A1 * | 8/2002 | Kim et al. | 375/147 |

FOREIGN PATENT DOCUMENTS

EP 1 065 793 A2 1/2000

OTHER PUBLICATIONS

Forney, Jr., G. David "Maximum-Likelihood Sequence Estimation of Digital Sequences in the Presence of Intersymbol Interference," IEEE Transactions on Information Theory, vol., IT-18, No. 3, May 1972, pp. 363-377.

Ungerboeck, Gottfried "Adaptive Maximum-Likelihood Receiver for Carrier-Modulated Data-Transmission Systems," IEEE Transactions on Communications, vol. Com-22, No. 5, May 1974, pp. 624-636.

(Continued)

*Primary Examiner*—Khai Tran
(74) *Attorney, Agent, or Firm*—Myers Bigel Sibley & Sajovec

(57) ABSTRACT

A communications signal representing symbols encoded according to respective portions of a spreading sequence is decoded. Time-offset correlations of the communications signal with the spreading sequence are generated. The time-offset correlations are combined to generate first estimates for the symbols. Intersymbol interference factors that include a relationship among different portions of the spreading sequence are determined, and a second estimate for one of the symbols is generated from the first estimates based on the determined intersymbol interference factors. An intersymbol interference factor may include a relationship between a first portion of the spreading sequence associated with the one symbol to a second portion of the spreading sequence associated with another symbol and may be determined, for example, from the spreading sequence and a channel estimate for a channel over which the communications signal is communicated. The invention may be embodied as methods and apparatus, for example, as a receiver included in a communications apparatus, such as a wireless terminal, wireless base station, or other wireless, wireline or optical communications apparatus.

75 Claims, 12 Drawing Sheets

OTHER PUBLICATIONS

Standard Search Report, U.S. Appl. No. 09/756,504, Aug. 29, 2001.
Lagunas, Miguel A., "Joint Array Combining and MLSE for Single-User Receivers in Multipath Gaussian Multiuser Channels," IEEE Journal on Selected Areas in Communication, vol. 18, No. 11, Nov. 2000, pp. 2252-2259.
Tantikovit et al., "Joint Multipath Diversity Combining and MLSE Equalization (Rake-MLSE Receiver) for WCDMA Systems," Vehicular Technology Conference Proceedings, 2000, VTC 2000-Spring. Tokyo, 2000 IEEE 51st, vol. 1, May 15-18, 2000, pp. 435-439.

* cited by examiner

APPARATUS AND METHODS FOR INTERSYMBOL INTERFERENCE COMPENSATION IN SPREAD SPECTRUM COMMUNICATIONS

BACKGROUND OF THE INVENTION

The present invention relates to communications apparatus and methods, and more particularly, to spread spectrum communications apparatus and methods.

Wireless communications systems are widely used to communicate voice and other data, and the use of such systems is increasing through the development of new applications. For example, in addition to traditional voice telephony applications, wireless systems are increasingly being used to provide data communications services such as internet access and multimedia applications.

FIG. 1 illustrates a typical direct sequence spread spectrum (DS-SS) signal generator, as might be used in a code division multiple access (CDMA) communications system. A data sequence is spread by a spreading sequence, which typically has a much higher baud rate. The spread signal thus produced is passed through a pulse shaping filter to generate a baseband signal s(t), which is given by:

$$s(t) = \sum_{i=-\infty}^{\infty} \alpha(i) f_i(t - iT), \tag{1}$$

$$f_i(t) = \sum_{l=0}^{N-1} a_i(l) p(t - lT_c), \tag{2}$$

where $f_i(t)$ is the spreading waveform for the ith symbol, $\alpha(i)$ is the ith data symbol, $a_i(l)$ is the lth "chip" of the spreading sequence in the ith symbol interval, N is the processing gain, $T_c$ is the chip duration, $T=NT_c$ is the symbol duration, and p(t) is the chip pulse. The baseband signal s(t) is then typically modulated by a carrier signal, and the resultant data-modulated carrier signal is transmitted in a communications medium, e.g., in air, wireline or other medium.

The channel experienced by a transmitted wireless DS-SS signal is typically modeled as a dispersive channel with an impulse response of the form:

$$g(t) = \sum_{l=0}^{L-1} g_l \delta(t - \tau_l) \tag{3}$$

where L is the number of multipaths, and $g_l$ and $\tau_l$ are the complex-valued attenuation factor and delay for the lth path, respectively. The baseband equivalent signal received over such a channel can be expressed as:

$$y(t) = \sum_{i} \alpha(i) h_i(t - iT) + n(t), \tag{4}$$

where:

$$h_i(t) = \sum_{l=0}^{L-1} g_l f_i(t - \tau_l), \tag{5}$$

and n(t) includes thermal noise and multi-user interference.

Conventionally, a RAKE receiver 200 as shown in FIG. 2 may be used to recover information from a DS-SS signal. A radio processor 220 converts a received signal received via an antenna 210 to baseband, including filtering the signal based on the chip pulse shape and sampling the result. A RAKE processor 230 includes a correlator 232 that correlates the sampled signal with a spreading sequence at a plurality of offset correlation times. For example, the correlator may include J RAKE "fingers," each matched to one signal ray (J=L), and a correlation between the received signal and a delayed version of the spreading sequence may be calculated at each finger. A combiner 234 typically employs maximum ratio combining (MRC) to combine the correlation values produced by the correlator 232, typically based on channel coefficient estimates produced by a channel estimator 240. Channel delay estimates generated by the channel estimator 240 may be used to determine the offset correlation times used by the correlator 232.

One important feature of so-called "third generation" wireless communications systems is the ability to provide services with a wide range of data rates to meet the varying information transmission needs of various services such as voice and data. For example, in IS-2000 and wideband CDMA (W-CDMA) wireless communications systems, multiple data rates may be achieved by using various combinations of codes, carriers and/or spreading factors. More particularly, in W-CDMA systems, the spreading factors of physical channels may range from 256 to 4, providing corresponding data rates from 15K baud per second (bps) and 0.96 Mbps.

For a physical channel employing a low spreading factor, a conventional RAKE receiver may not perform well if the channel is dispersive. This performance degradation may arise because the processing gain provided by signal spreading may not be sufficient to reject inter-symbol interference (ISI) arising from multipath propagation. Consequently, user throughput and coverage may be limited by multipath delay spread.

SUMMARY OF THE INVENTION

According to embodiments of the present invention, a communications signal representing symbols encoded according to respective portions of a spreading sequence is decoded. Time-offset correlations of the communications signal with the spreading sequence are generated. The time-offset correlations are combined to generate first estimates for the symbols. Intersymbol interference factors that include a relationship among different portions of the spreading sequence are determined. A second estimate for one of the symbols is generated from the first estimates based on the determined intersymbol interference factors.

An intersymbol interference factor may include a relationship between a first portion of the spreading sequence associated with the one symbol and a second portion of the spreading sequence associated with another symbol. An intersymbol interference factor may be determined, for example, from the spreading sequence and a channel estimate for a channel over which the communications signal is communicated. The second estimate may be generated from the first estimates using, for example, a sequence estimation procedure that employs a branch metric that is a function of the determined intersymbol interference factors. Alternatively, a linear equalization procedure that uses weighting factors generated based on knowledge of the symbol dependence of the spreading sequence may be used.

According to other embodiments of the present invention, a communications signal representing symbols encoded according to respective portions of a spreading sequence is decoded. A plurality of time-offset correlations of the communications signal with the spreading sequence is generated. The plurality of time-offset correlations are combined to generate a first estimate for one of the symbols. An intersymbol interference factor that includes a relationship among different portions of the spreading sequence is determined. A second estimate for the one symbol is generated from the first estimate based on the determined intersymbol interference factor.

According to yet other embodiments of the present invention, a communications signal representing symbols encoded according to a spreading sequence is decoded. Time time-offset correlations of the communications signal with the spreading sequence are generated. Weighting factors are generated from a channel estimate for a channel over which the communications signal is communicated and knowledge of an interfering component of the communications signal. The time-offset correlations are combined according to the determined weighting factors to generate first estimates of the symbols. Intersymbol interference factors are determined from the spreading sequence, and a second estimate for one of the symbols is generated from the first estimates based on the determined intersymbol interference factor.

The present invention may be embodied as methods and apparatus. For example, the present invention may be embodied in a receiver included in a communications apparatus, such as a wireless terminal, wireless base station, or other wireless, wireline or optical communications apparatus.

DETAILED DESCRIPTION

Figure 1:
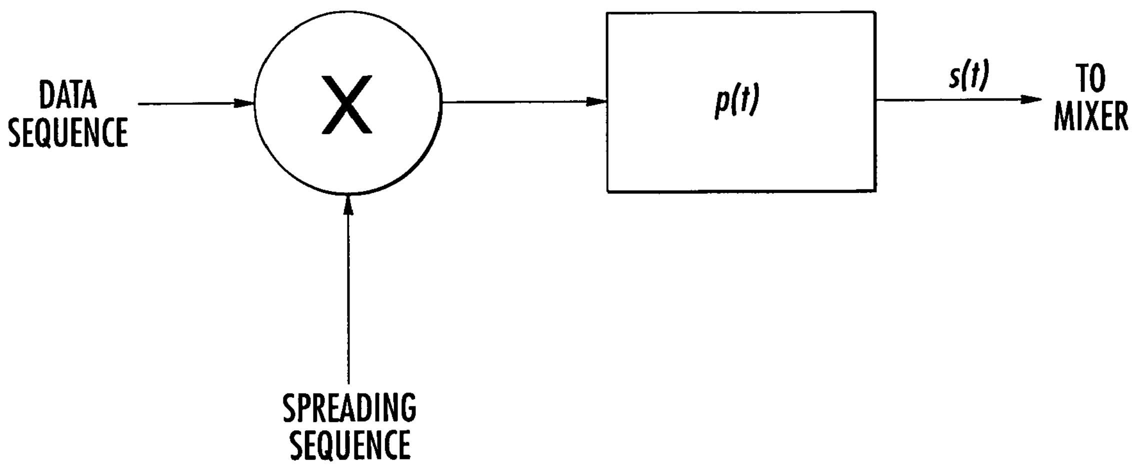
FIG. 1 is a schematic diagram illustrating a conventional direct sequence spread spectrum (DS-SS) transmitter.
Figure 2:
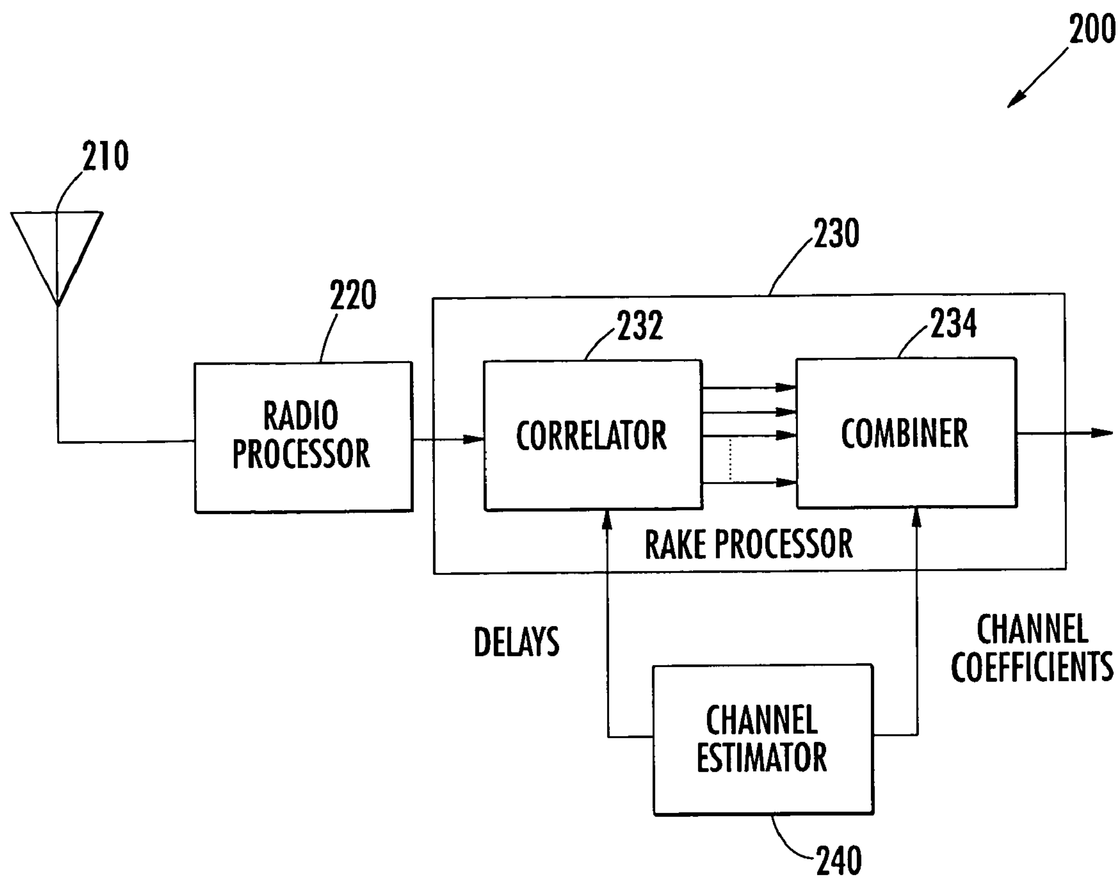
FIG. 2 is a schematic diagram illustrating a conventional DS-SS receiver.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

In the present application, FIGS. 3–11 are schematic diagrams, flowcharts and signal constellation diagrams illustrating exemplary communications apparatus and operations according to embodiments of the present invention. It will be understood that blocks of the schematic diagrams and flowcharts, and combinations of blocks therein, may be implemented using one or more electronic circuits, such as circuits included in a wireless terminal or in a wireless communications system (e.g., in a cellular base station or other device), or circuitry used in other types of wireless, wireline, optical and other communications systems. It will also be appreciated that, in general, blocks of the schematic diagrams and flowcharts, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the functions specified in the block or blocks. The computer program instructions may also be executed on a computer or other data processing apparatus to cause a series of operations to be performed on the computer or other programmable apparatus to produce a computer implemented process such that the instructions which execute on the computer or other programmable apparatus provide operations for implementing the functions specified in the block or blocks. Accordingly, blocks of the schematic diagrams and flowcharts support electronic circuits and other means that perform the specified functions, as well as operations for performing the specified functions.

It will also be appreciated that the apparatus and operations illustrated in FIGS. 3–11 may be implemented in a variety of communications environments, including wireless, wireline and optical communications environments. For example, the communications apparatus and operations illustrated in FIGS. 3–11 may be embodied in a wireless terminal, a wireless base station, a wireline communications device, an optical communications device, or other communications apparatus. It will be appreciated that the processing apparatus and operations illustrated in FIGS. 3–11 may be combined with other apparatus and operations (not shown), including additional signal processing apparatus (e.g., circuits that provide such functions) and operations.

According to some embodiments of the present invention, a communications signal representing a symbol encoded according to a spreading sequence is decoded by generating time-offset correlations of the communications signal and the spreading sequence, and combining the correlations to generate a first estimate of the symbol, e.g., as might be done in a RAKE processor or a modified RAKE processor. This first estimate is revised using an estimation procedure, such as a maximum likelihood sequence estimation (MLSE) procedure, a decision feedback sequence estimation (DFSE) procedure or a reduced state sequence estimation (RSSE) procedure, that uses intersymbol interference (ISI) factors that relate portions of the spreading sequence, e.g., ISI factors generated from channel estimates and cross-correlations of the spreading sequence. For example, the sequence estimation procedure may use a branch metric that is a function of ISI factors.

Figure 3:
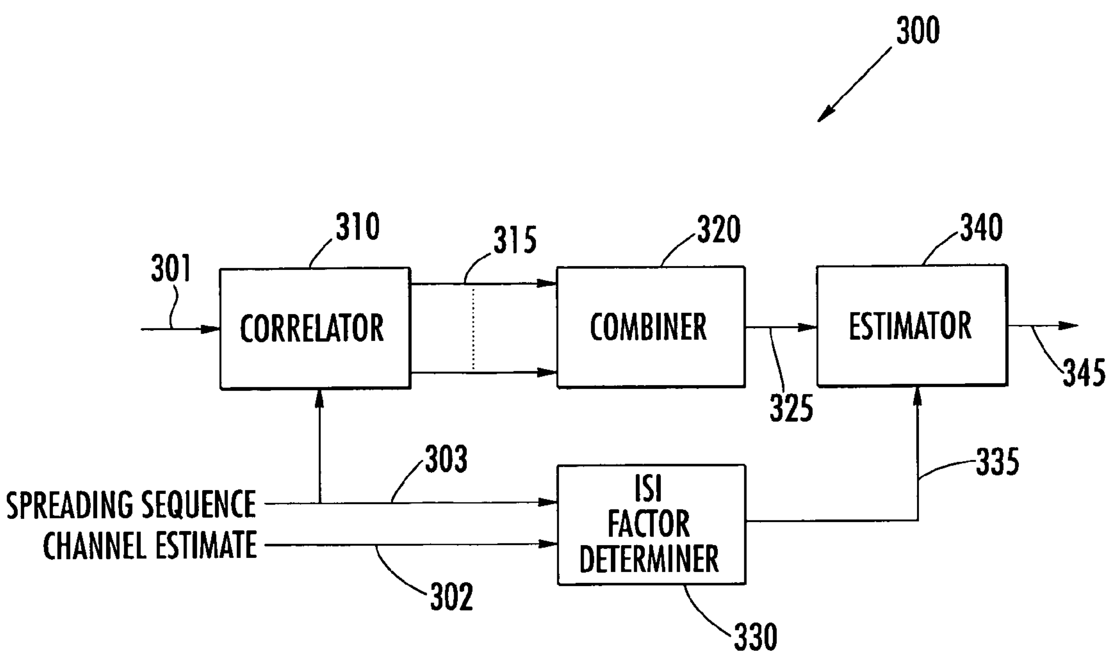
FIG. 3 is a schematic diagram illustrating a signal processing apparatus according to embodiments of the present invention.

FIG. 3 illustrates an apparatus 300, according to embodiments of the present invention, for decoding a communications signal 301 that represents a symbol sequence encoded according to a spreading sequence. A correlator 310 generates time offset correlations 315 of the communications signal 301 with a spreading sequence 303. A combiner 320, e.g., a RAKE combiner, combines the time-offset correlations 315 to generate first estimates 325, e.g., decision statistics, for symbols. A symbol estimator 340 generates second estimates 345 for symbols from the first estimates 325 based on ISI factors 335 generated by an ISI factor determiner 330. The ISI factors 335 include a relationship between portions of the spreading sequence, which may be generated, for example, responsive to a channel estimate 302 and the spreading sequence 303 as described in greater detail below.

According to some embodiments of the present invention, a sequence estimation procedure that employs a branch metric that is a function of an ISI factor is used to revise symbol estimates produced by a RAKE processor. Two structures used in maximum likelihood sequence estimation (MLSE) procedures are the Forney form and the Ungerboeck form, as described in G. D. Forney, "Maximum-Likelihood Sequence Estimation of Digital Sequences in the Presence of the Intersymbol Interference," *IEEE Trans. Inform. Theory,* vol. IT-18, no. 5, pp. 363–378 (May 1972) and G. Ungerboeck, "Adaptive Maximum Likelihood Receiver for Carrier Modulated Data Transmission Systems," *IEEE Trans. Commun.,* vol. COM-22, no. 3, pp. 624–635 (March 1974), respectively. Each form typically employs the well-known Viterbi algorithm. Typically, the branch metrics used in the Viterbi algorithms for the Forney and Ungerboeck forms are different. If the Forney form is used, the branch metric typically is an Euclidean metric, whereas, in the Ungerboeck form, the branch metric is typically the Ungerboeck metric. A Forney form receiver also typically uses a whitening filter and a discrete matched filter, both of which generally depend on the signal waveform.

In CDMA systems, the scrambling spreading sequence applied to a symbol sequence to be transmitted often varies from symbol to symbol, i.e., the scrambling sequence has a period greater than the symbol period, such that successive symbols are spread according to different portions of the scrambling sequence. If a Forney form were used in a receiver for a signal spread in such a symbol-dependent manner, the whitening filter and discrete matched filter used in the received would generally need to change from symbol to symbol, making the Forney form less attractive for use in decoding such signals.

According to some embodiments of the present invention, an Ungerboeck form is used. The branch metric at the ith stage of the Viterbi decoder used in an MLSE procedure may be given by:

$$M_H(i) = \mathrm{Re}\left\{a_i^*\left[2z(i) - s_{0,i}\alpha_i - 2\sum_{\substack{l \\ l>0}} s_{l,i}\alpha_{i-l}\right]\right\} \tag{6}$$

where $\alpha_i$ is the ith hypothesized symbol along the trellis path, and $$z(i) = \sum_{j=0}^{L-1} g_j^* \int_{-\infty}^{\infty} f_i^*(t-\tau_j)y(t)dt \tag{7}$$

$$s_{l,i} = \sum_{n=1-N}^{N-1} C_{i,i-l}(n)(\phi_g(t) * \phi_p(t))\Big|_{t=lT-nT_c^*} \tag{8}$$

In the above equations, the parameter z(i) is the output of a RAKE processor, $s_{l,i}$ is an intersymbol interference (ISI) factor (a so-called "s-parameter"), and $C_{i,i-l}(n)$, $\phi_g(t)$ and $\phi_p(t)$ are, respectively, the autocorrelation functions of the spreading sequence, channel impulse response g(t), and chip pulse shape function p(t). Furthermore:

$$C_{i,j}(m) = \begin{cases} \sum_{l=0}^{N-1-m} a_i^*(l+m)a_j(l), & 0 \le m \le N-1 \\ \sum_{l=0}^{N-1+m} a_i^*(l)a_j(l-m), & 1-N \le m < 0 \end{cases} \tag{9}$$

$$\phi_p(t) = \int_{-\infty}^{\infty} p^*(\tau)p(t+\tau)d\tau \tag{10}$$

$$\begin{aligned}\phi_g(t) &= \int_{-\infty}^{\infty} g^*(\tau)g(t+\tau)d\tau \\ &= \sum_{j=0}^{L-1}\sum_{k=0}^{L-1} g_j^* g_k \delta(t+\tau_j-\tau_k).\end{aligned} \tag{11}$$

Typically, the autocorrelation function of the pulse shape is nonzero only within a finite interval, such that:

$$\phi_p(t) \approx 0,\ |t| > L_0 T_c. \tag{12}$$

Note that $$s_{l,i} \approx 0,\ l > l_{max}, \tag{13}$$

for some $l_{max}$ that depends on the pulse shape and delay spread.

Figure 4:
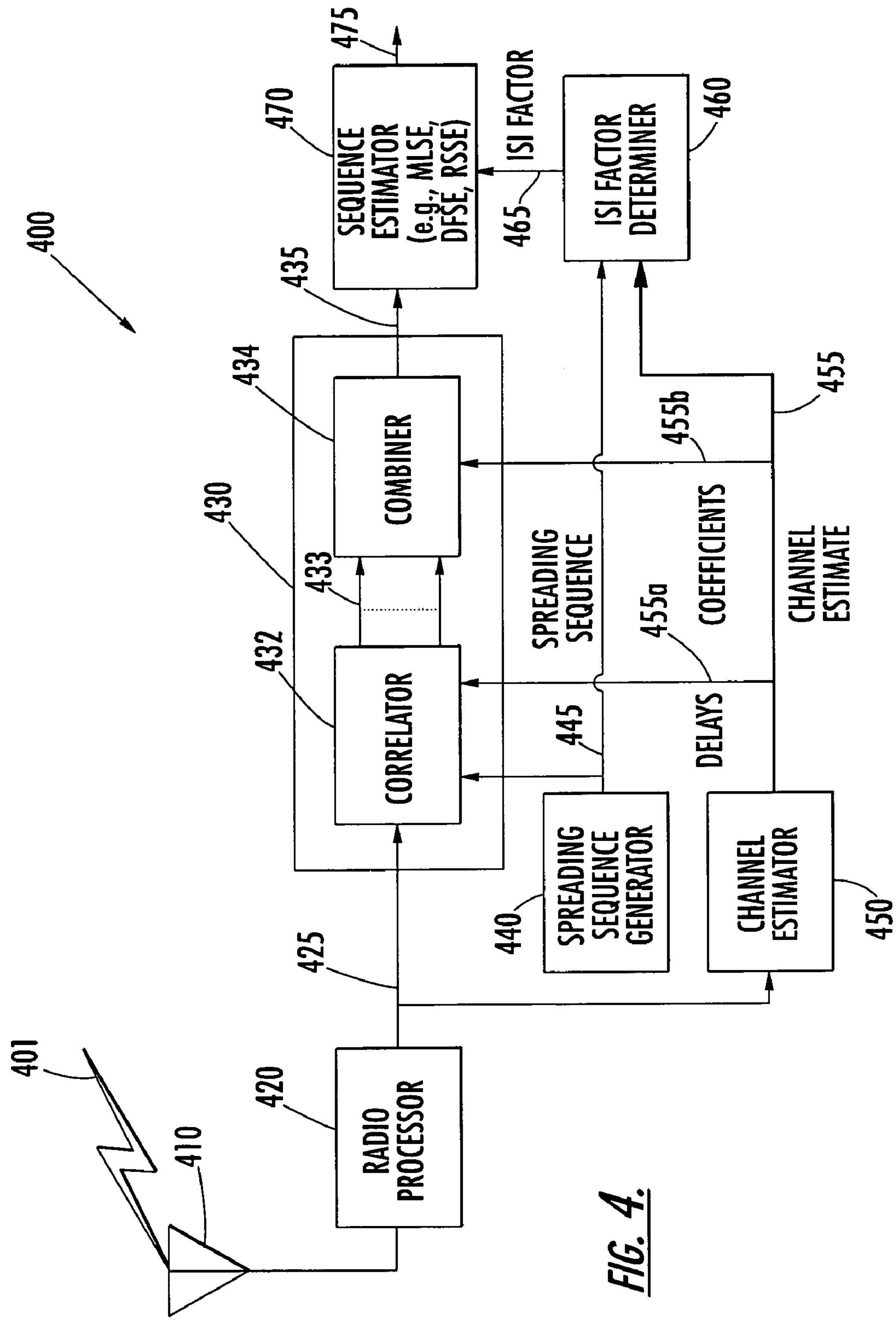
FIG. 4 is a schematic diagram illustrating a RAKE receiver according to embodiments of the present invention.

FIG. 4 illustrates a receiver 400 according to embodiments of the present invention that uses an MLSE procedure that employs ISI factors, such as the s-parameters described above, to revise symbol estimates produced by a RAKE processor. An antenna 410 receives a communications signal 401, which is processed by a radio processor 420 to generate a baseband signal 425. A RAKE processor 430 includes a correlator 432 that generates time-offset correlations 433 of the baseband signal 425 with a spreading sequence 445 produced by a spreading sequence generator 440. The time-offset correlations 433 may be for correlation times corresponding to delays 455*a* of a channel estimate 455 produced by a channel estimator 450. A combiner 434 combines the time-offset correlations 433 according to channel coefficients 455*b* of the channel estimate 455, producing first estimates 435 of symbols represented by the communications signal 401. An ISI factor determiner 460 generates ISI factors 465 based on the channel estimate 455 and the spreading sequence 445. A sequence estimator 470 generates second estimates 475 from the first estimates 435 based on the ISI factors 465. For example, as described above with reference to equation (6), the sequence estimator 470 may process the first estimates 435 according to a sequence estimation procedure that uses a branch metric that is a function of the ISI factors 465.

According to other embodiments of the present invention, the number of states used in the sequence estimator 470 is varied responsive to the spreading factor, symbol modulation, and channel estimate (which, for purposes of the present application, may include the chip pulse shape function) for the channel over which a received signal is communicated. In some embodiments, for example, for some $l_{max}$ where $s_{l,t}\cong 0, l>l_{max}$, the number of states used in the sequence estimator 470 may be $A^{l_{max}}$, where A is the number of constellation points of the symbol modulation. When the nonzero -lag s-parameters are all of small magnitudes, the sequence estimator 470 may include a symbol-by-symbol detector. In still other embodiments, the value $l_{max}$ can be quantized to a finite set of values; consequently, the number of states used in the sequence estimator need only take values from a finite set of integer numbers.

In yet other embodiments of the present invention, the number of states used in the sequence estimator 470 is selected from a set consisting of 1 or $A^L$, where L is a predetermined number greater than zero, based on the delay spread (which, for purposes of the present application, may be considered as part of the channel estimate) and spreading factor. In such a case, an appropriate branch metric is given by:

$$M_H(i)=Re\{\alpha_i^*[2z(i)-s_{0,i}\alpha_i]\}, \tag{14}$$

for the one state case, and $$M_H(i)=\mathrm{Re}\left\{\alpha_i^*\left[2z(i)-s_{0,i}\alpha_i-2\sum_{l=1}^{L}s_{l,i}\alpha_{i-l}\right]\right\}, \tag{15}$$

for the $A^L$ state case.

For the one state case, each symbol may be decided separately. Thus, one initial symbol estimate z(i) can be used to determine the ith symbol. Under common operating conditions, the s-parameter $s_{0,i}$ is the same for all i and, accordingly, there is only one s-parameter.

It is common for forward error correction (FEC) decoding to follow symbol estimation. Typical FEC decoders operate on so-called "soft" bit values, which can be viewed as a form of symbol estimation in which one of soft bit values constitute a symbol estimate. For the one state case discussed above, a soft value can be determined using the first symbol estimate z(i) and the single s-parameter. For example, for a symbol corresponding to 3 bits, as in 8-PSK, a log-likelihood value associated with each possible symbol value can be determined by taking the magnitude squared of the difference between z(i) and $s_{0,0}\ \alpha_i$, where $\alpha_i$ corresponds to the possible symbol value. For a particular bit that makes up the 8-PSK symbol, four symbol values correspond to the bit being a "0" and four correspond to the bit being a "1". A technique for using such log-likelihood values to determine a soft value for a bit is described in U.S. patent application Ser. No. 09/587,995, entitled "Baseband processors and methods and systems for decoding a received signal having a transmitter or channel induced coupling between bits," to Bottomley et al., filed Jun. 6, 2000. For the case of multiple states, standard techniques for extracting soft bit information for MLSE based sequence detectors, such as the soft output Viterbi algorithm (SOVA) can be used. Such approaches are described in C. Nill and C. Sundberg, "List and soft symbol output Viterbi algorithms: extensions and comparisons," *IEEE Trans. Commun.,* vol. 43, pp. 277–287, February/March/April 1995, and in P. Hoeher, "Advances in soft-output decoding," *Proc. Globecom* '93, Houston, Tex., Nov. 29–Dec. 2, pp. 793–797, 1993.

Figure 5:
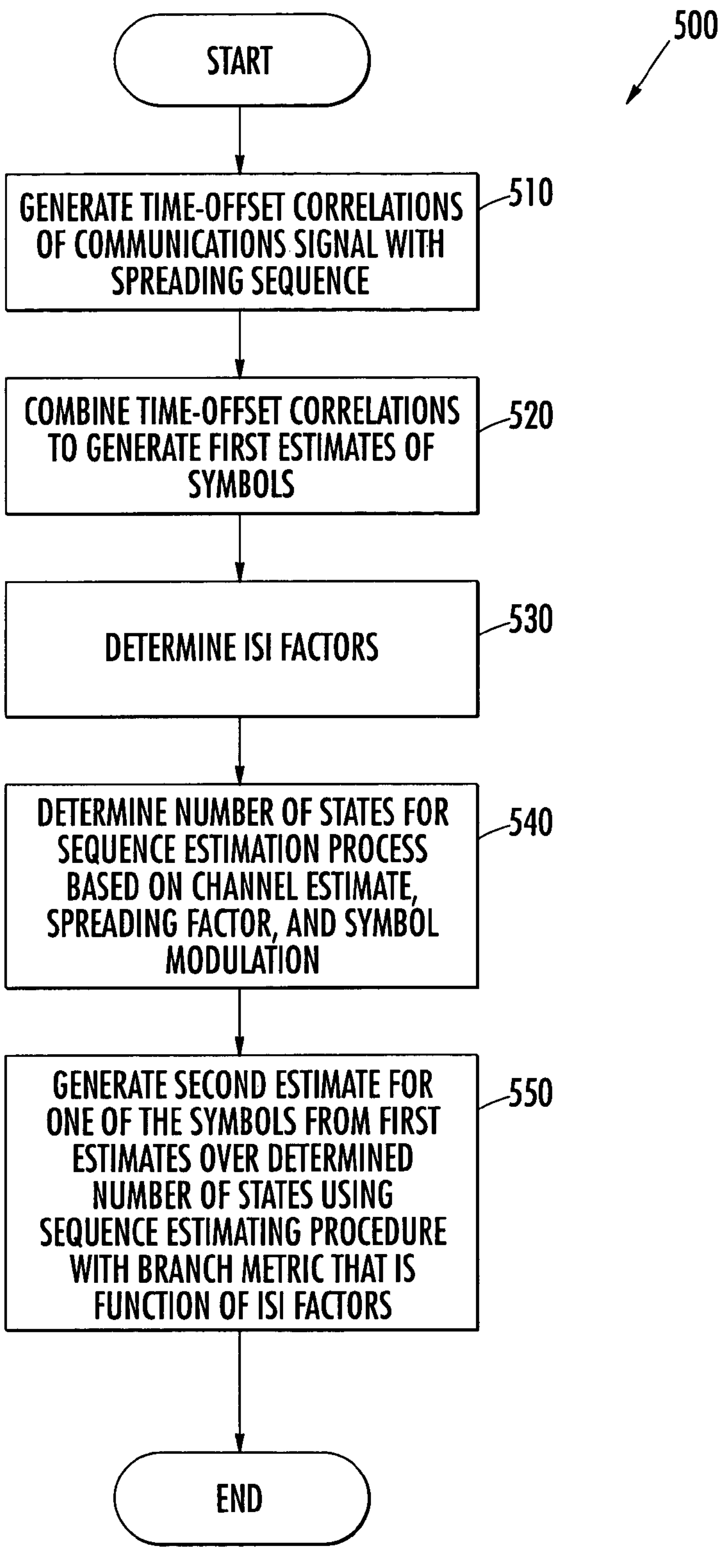
FIG. 5 is a flowchart illustrating exemplary operations for generating a symbol estimate according to embodiments of the present invention.

FIG. 5 illustrates exemplary operations 500, according to embodiments of the present invention, for generating a symbol estimate using state number selection techniques, such as those described above. Time-offset correlations of a communications signal and a spreading sequence are generated (Block 510). The time-offset correlations are then combined to generate first estimates of symbols (Block 520). ISI factors are determined (Block 530). A number of states for a sequence estimation procedure is determined based on a channel estimate, spreading factor and symbol modulation (Block 540) using, for example, one of the above-described procedures for selecting a number of sequence estimation states. A second estimate of one of the symbols is generated from the first estimates using the determined number of states and a branch metric that is a function of the ISI factors (Block 550).

Figure 6:
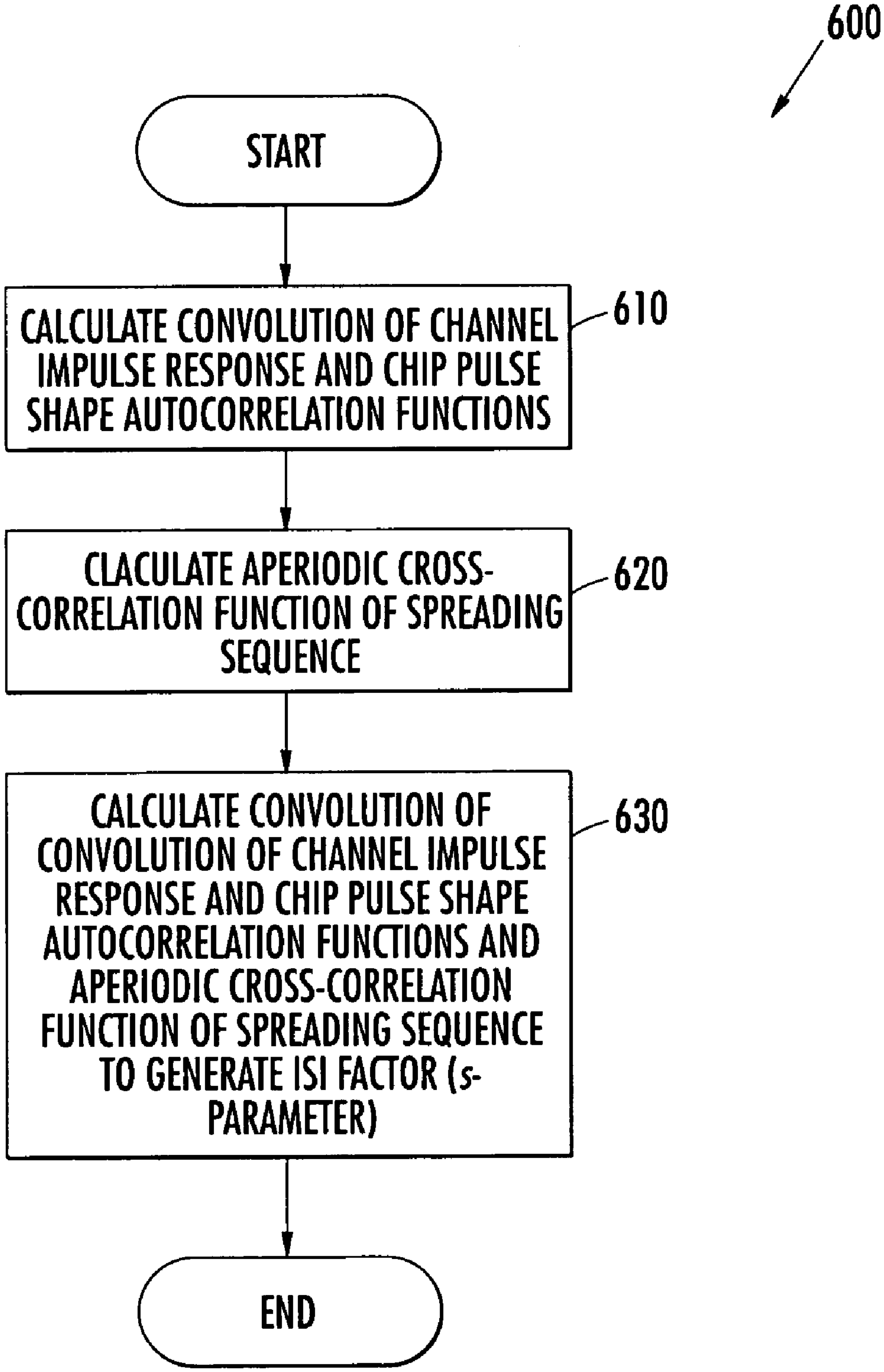
FIG. 6 is a flowchart illustrating exemplary operations for generating an intersymbol interference (ISI) factor according to embodiments of the present invention.

FIG. 6 illustrates exemplary operations 600 for determining an ISI factor, in particular, an s-parameter, as described above with reference to equation (8). A convolution of a channel impulse response autocorrelation function and a chip pulse shape autocorrelation function is determined (Block 610). An aperiodic cross-correlation of the spreading sequence is determined (Block 620). A convolution of these results is then calculated to generate an s-parameter (Block 630).

As described above, the number of states used in the sequence estimator 470 of FIG. 4 may depend on $l_{max}$. As $l_{max}$ increases, however, the complexity of the sequence estimator 470 may increase to undesirable levels. According to other embodiments of the present invention, this complexity may be reduced by using a fixed number of states $A^L$. However, if $L<<l_{max}$, this approach could result in significant performance degradation.

According to still other embodiments of the present invention, a tradeoff between complexity and performance may be achieved by using a form of decision-feedback sequence estimation (DFSE) in the sequence estimator 470 of FIG. 4. According to such an approach, $l_{max}+1$ taps may be split into $l_F+1$ feed-forward taps and $l_B$ feedback taps, where $l_F+l_B=l_{max}$. The decisions associated with the feedback taps are used in the branch metric calculations. The modulation values of the symbols associated with the feed-forward taps are hypothesized using a state trellis with $A^{l_F}$ states. A branch metric for such a procedure may be given by:

$$M_H(i)=\mathrm{Re}\left\{\alpha_i^*\left[2z(i)-s_{0,i}\alpha_i-2\sum_{l=1}^{l_F}s_{l,i}\alpha_{i-l}-2\sum_{l=l_F+1}^{l_{max}}s_{l,i}\hat{\alpha}_{i-l}\right]\right\}, \tag{16}$$

where $\hat{\alpha}_i$ is the tentatively demodulated symbol on the trellis path.

Similar to the MLSE embodiments described above, the number of feed-forward taps can be quantized into a finite number of values, in the extreme, to two values $l_F=0$ or L. When $l_F=0$, the trellis reduces to one state and the receiver becomes a form of decision-feedback equalizer (DFE). In this case, the branch metric may be expressed as:

$$M_H(i) = \mathrm{Re}\left\{\alpha_i^*\left[2z(i) - s_{0,i}\alpha_i - 2\sum_{l=l}^{l_{\max}} s_{l,i}\hat{\alpha}_{i-l}\right]\right\}. \quad (17)$$

DFSE with an Ungerboeck metric may be improved by introducing a bias, as shown in A. Hafeez, "Trellis and Tree Search Algorithms for Equalization and Multiuser Detection," Ph.D. Thesis, University of Michigan (Ann Arbor, April 1999). Such a technique can be used with the present invention.

Complexity of the sequence estimator 470 may also be reduced by using a reduced-state sequence estimation (RSSE) technique along the lines proposed in M. V. Eyuboglu et al., "Reduced-State Sequence Estimation with Set Partitioning and Decision Feedback," *IEEE Trans. Commun.,* vol. COM-36, no. 1, pp. 13–20 (January 1988). According to such an approach, a set partitioning technique is used to group constellation points, which are farther apart, as a subset. An MLSE trellis is then reduced to a subset trellis in which each node represents a combination of subsets of symbols. For each transition, the symbol that has the largest branch metric is chosen to represent its subset.

Figure 7:
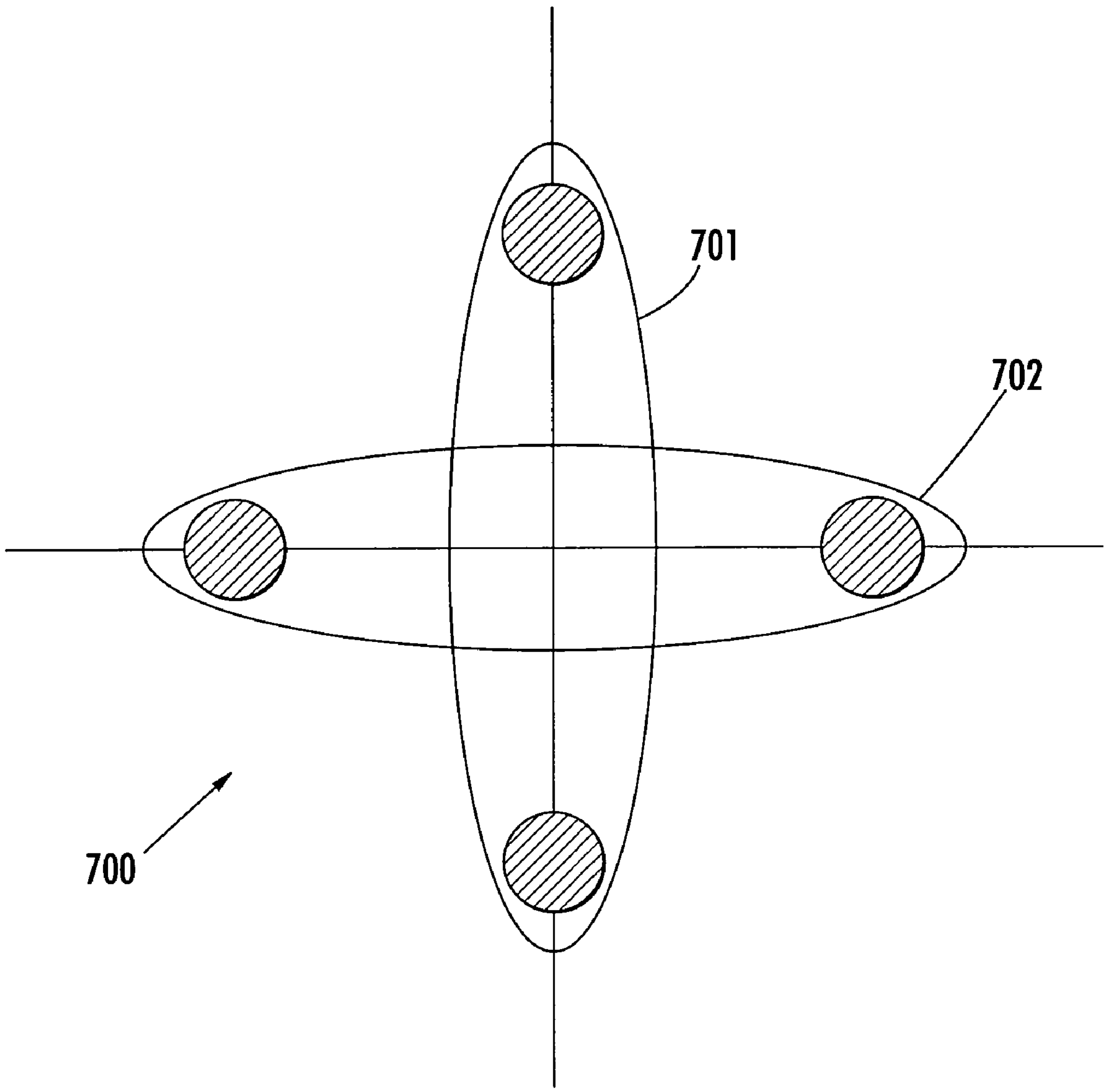
FIGS. 7 and 8 are charts graphically illustrating signal constellation partitioning for a reduced state sequence estimation (RSSE) process according to embodiments of the present invention.
Figure 8:
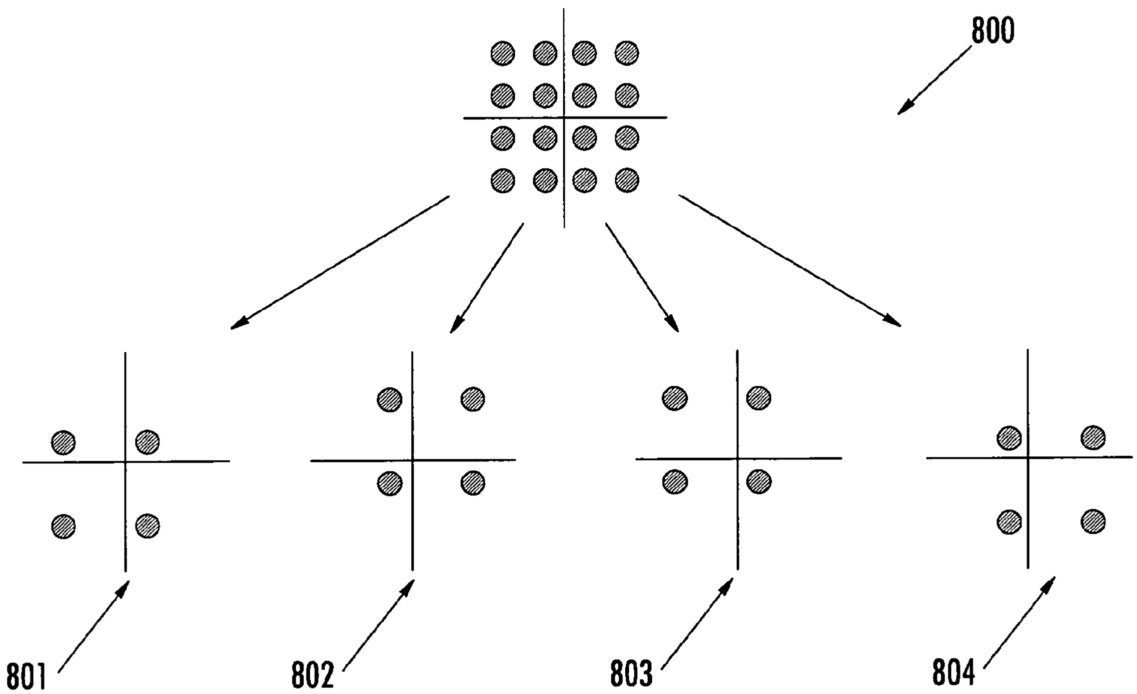

FIG. 7 illustrates subsets 701, 702 defined by a set partitioning scheme for a quadrature phase shift keying (QPSK) constellation 700 that can be applied in an RSSE procedure according to embodiments of the present invention. Using such a scheme, the number of trellis states can be reduced from $4^b$ to $2^b$. FIG. 8 illustrates subsets 801, 802, 803, 804 of a 16 quadrature amplitude modulation (16-QAM) constellation 800 defined under another set partitioning scheme for an RSSE procedure according to other embodiments of the invention. Using such a scheme, the number of trellis states can be reduced from $16^b$ to $4^b$. An RSSE procedure as described above can also be combined with DFSE. According to other embodiments of the invention, a state estimation procedure may be selected from a group including MLSE, DFSE, and RSSE procedures depending on $l_{max}$, which can be determined from the delay spread (channel estimate) and spreading factor.

According to still other embodiments of the present invention, ISI factors may be used to generate revised symbol estimates from symbol estimates generated by a so-called generalized RAKE (G-RAKE) processor as described, for example, in U.S. Pat. No. 5,572,552 to Dent et al., U.S. patent application Ser. No. 09/165,647 to Bottomley, filed Oct. 2, 1998, U.S. patent application Ser. No. 09/344,898 to Bottomley et al. et. al, filed Jun. 25, 1999, U.S. patent application Ser. No. 09/344,899 to Wang et. al, filed Jun. 25, 1999, and U.S. patent application Ser. No. 09/420,957 to Ottosson et. al, filed Oct. 19, 1999, each of which is incorporated herein by reference in its entirety.

For such a G-RAKE processor, the above-described initial estimate, or z-parameter, may be expressed as:

$$z(i)=w^H(i)y(i), \quad (18)$$

{TIEQ}$y(i)=(y_i(iT+d_0), \ldots, y_i(iT+d_{j-1}))^T$, {PGRAPH} (19) {PARA0}

$$y_i(\tau) = \int_{-\infty}^{\infty} f_i^*(t)y(t+\tau)\,dt, \quad (20)$$

$y_i(\tau)=\int_{-\infty}^{\infty}f_i^*(t)y(t+\tau)dt$, (20)

where $d_j$ is the jth correlation time (e.g., finger delay), J is the total number of correlation times (e.g., fingers), $y_i(iT+d_j)$ is the correlator output (e.g., finger output) for correlation time $d_j$, and w(i) is the vector of combining weighting factors. It can be shown that the noise at each correlation finger output includes three components, an intersymbol interference (ISI) component, a multiuser interference (MUI) component, and a thermal noise component. It can be further shown that these noise components are statistically independent. As a result, the noise correlation between correlation fingers during the ith symbol time may be given by:

$$R(i)=R_{ISI}(i)+R_{MUI}(i)+R_N(i), \quad (21)$$

where $R_{ISI}(i)$, $R_{MUI}(i)$ and $R_N(i)$ are correlations between fingers for the ISI, MUI and thermal noise components, respectively. According to embodiments of the present invention, the weighting factors for a maximum likelihood detector, given J and $$\{d_j\}_{j=0}^{J-1},$$

are:

$$w(i)=(R_{MUI}(i)+R_N(i))^{-1}h(i), \quad (22)$$

where h(i) is the net channel response for symbol i. The matrix R(i) accounts for noise correlation between fingers and represents knowledge of the interfering component.

In some G-RAKE receiver embodiments of the present invention, correlations to a pilot channel are performed at different lags or delays. The net channel response h can be estimated in a number of ways. Preferably, correlations at the lags corresponding to signal rays or paths are performed. Then, using knowledge of the transmit and receive filter responses, the medium response (net response h minus the effects of transmit and receive filters) is determined. From the medium response, the net channel response h may be determined by summing the contributions of the different paths using knowledge of the transmit and receive filter responses. Alternatively, the net channel response h can be determined by smoothing correlations at each lag. Once the net channel response h has been determined, the signal component on each pilot correlation may be removed, leaving instantaneous noise values. These noise values may be correlated to one another and smoothed to obtain an estimate of the noise covariance R.

Preferably, the intersymbol interference that the equalizer will handle is not included in the noise covariance matrix R. To achieve this, noise values are obtained by removing all signal components handled by the equalizer from the pilot correlations. The current symbol value can be removed, as normally done in a G-RAKE receiver. Intersymbol interference is removed by knowing the channel coefficient of the ISI term, as well as the cross-correlation between a current symbol spreading code and the codes used for nearby symbols that form the ISI term. The pilot symbol values are also needed if they are not the same.

Using a G-RAKE structure, ISI factors (s-parameters) analogous to the s-parameters described above for the conventional RAKE structure may be defined according to the relations:

$$s_{l,i} = w^H(i)x_{l,i} \tag{23}$$

$$x_{l,i} = (x_{l,i}(lT + d_0), \ldots, x_{l,i}(lT + d_{J-1}))^T \tag{24}$$

$$\begin{aligned} x_{l,i}(t) &= f_i^*(-\tau) * h_{i-l}(\tau) \\ &= \sum_{j=0}^{L-1} g_j \int_{-\infty}^{\infty} f_i^*(\tau) f_{i-1}(t+\tau-\tau_j)\,d\tau \\ &= \sum_{j=0}^{L-1} \sum_{n=1-N}^{N-1} g_j C_{i,i-1}(n)\phi_p(t-nT_c-\tau_j). \end{aligned} \tag{25}$$

Figure 9:
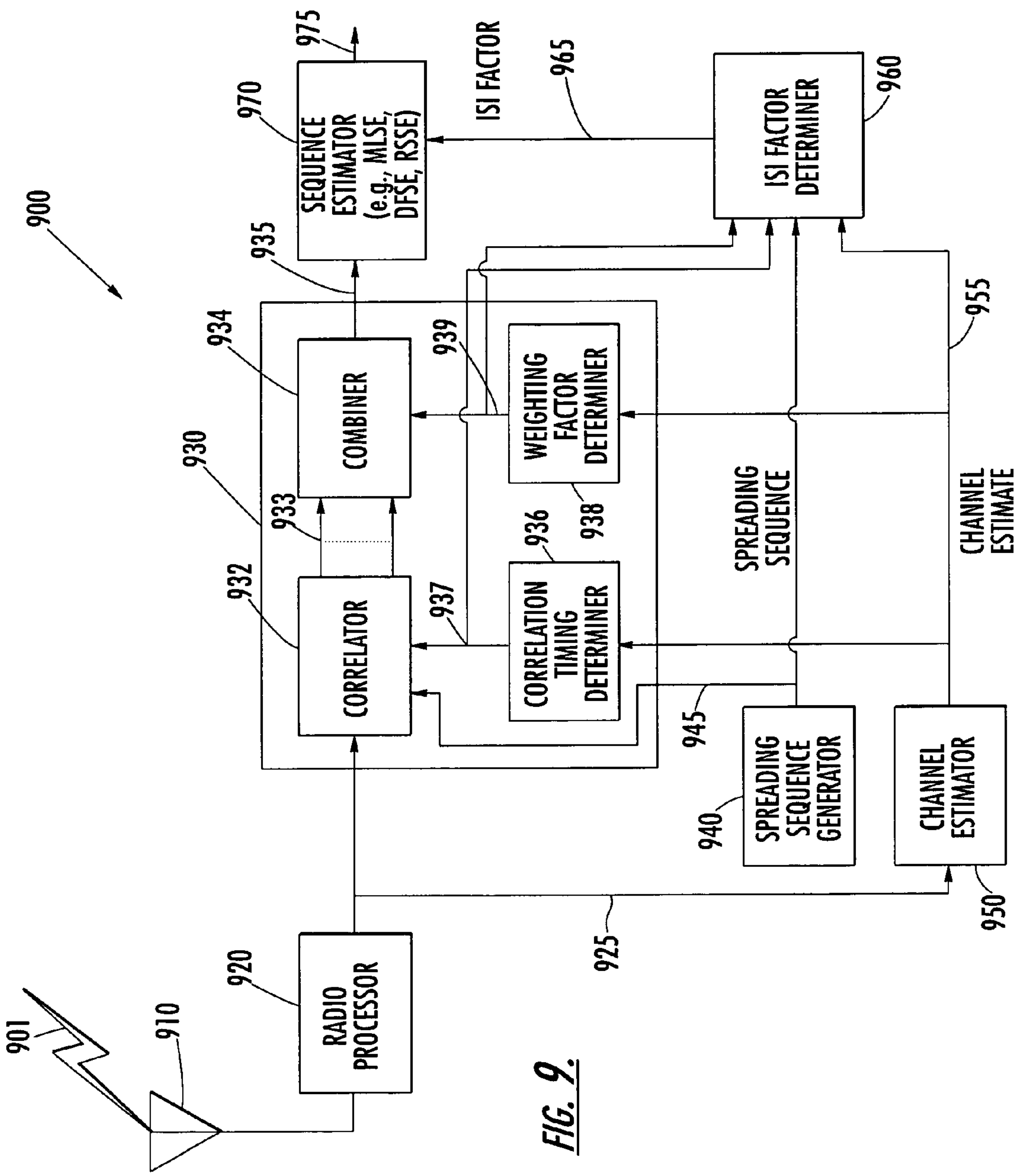
FIG. 9 is a schematic diagram illustrating a generalized RAKE (G-RAKE) receiver according to still other embodiments of the present invention.

FIG. 9 illustrates a receiver 900 according to embodiments of the present invention that uses an MLSE procedure to revise symbol estimates produced by a G-RAKE processor. An antenna 910 receives a communications signal 901, which is processed by a radio processor 920 to generate a baseband signal 925. A G-RAKE processor 930 includes a correlator 932 that generates time-offset correlations 933 of the baseband signal 925 with a spreading sequence 945 produced by a spreading sequence generator 940. The time-offset correlations 933 are for correlation times 937 determined by a correlation timing determiner 936 based on a channel estimate 955 produced by a channel estimator 950, for example, as described in the aforementioned U.S. patent application Ser. No. 09/420,957.

A combiner 934 combines the time-offset correlations 933 according to weighting factors 939 generated by a weighting factor determiner 938 based on the channel estimate 955, for example, as described in the aforementioned U.S. patent application Ser. No. 09/344,899. combiner 934 produces first estimates 935 of symbols represented by the communications signal 901. An ISI factor determiner 960 generates ISI factors 965 (e.g., s-parameters) based on the channel estimate 955, the spreading sequence 945, the correlation times 937 and the weighting factors 939. A sequence estimator 970 generates second estimates 975 of the symbols from the first estimates 935 based on the ISI factors 965. For example, as described above with reference to equation (6), the sequence estimator 970 may process the first estimates 935 according to a sequence estimation procedure that uses a branch metric that is a function of the ISI factors 965.

In a manner similar to that described above with reference to the receiver 400 of FIG. 4, the number of states used in the sequence estimator 970 may be varied responsive to the channel estimate, spreading factor, symbol modulation, and chip pulse shape function, along with the G-RAKE correlation times 937 and the weighting factors 939. For example, for some $l_{max}$ where $s_{l_{max,i}} \cong 0, l > l_{max}$, the number of states used in the sequence estimator 970 may be $A^{l_{max}}$, where A is the number of constellation points of the symbol modulation. When the nonzero -lag s-parameters are all of small magnitudes, the sequence estimator 970 may include a symbol-by-symbol detector. In other embodiments, the value $l_{max}$ can be quantized to a finite set of values; consequently, the number of states used in the sequence estimator only take values from a finite set of integer numbers. In still other embodiments, the number of states used in the sequence estimator 970 can be either 1 or $A^L$, where L>0 is a predetermined number. The choice of whether a one state (i.e. symbol-by-symbol detector) or $A^L$-state trellis is used in the sequence estimator may be made based on the delay spread and spreading factor. For example, if the delay spread is large and the spreading factor is small, an $A^L$-state may be desirable. An appropriate branch metric for such a case is given by:

$$M_H(i) = Re\{\alpha_i^*[2z(i) - s_{0,i}\alpha_i]\}, \tag{26}$$

for the one state case, and by:

$$M_H(i) = \mathrm{Re}\left\{\alpha_i^*\left[2z(i) - s_{0,i}\alpha_i - 2\sum_{l=1}^{L} s_{l,i}\alpha_{i-l}\right]\right\}, \tag{27}$$

for the $A^L$-state case. The aforementioned DFSE and RSSE techniques can be also applied to the G-RAKE embodiments of FIG. 9 to reduce complexity.

Figure 10:
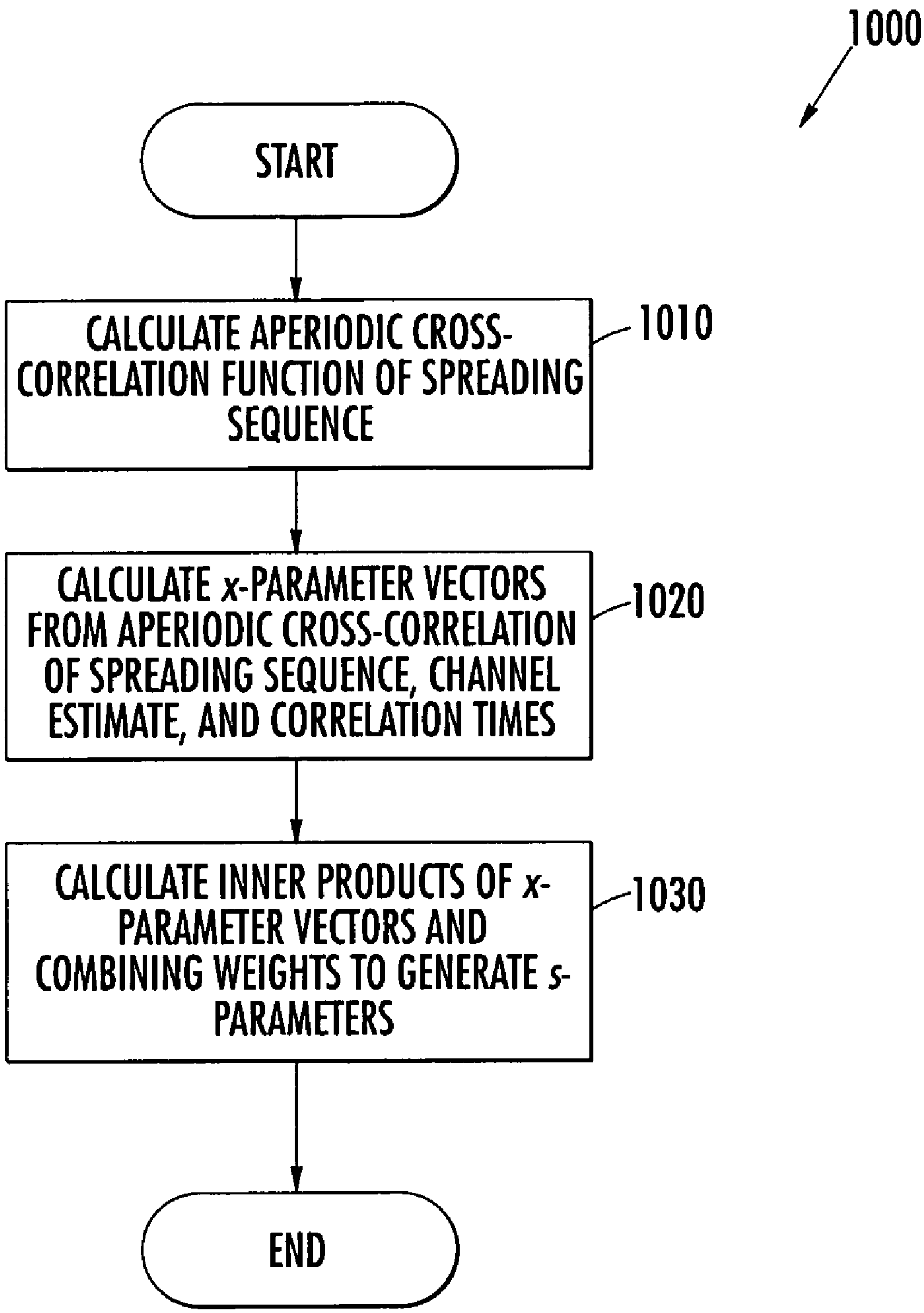
FIG. 10 is a flowchart illustrating exemplary operations for determining an ISI factor according to embodiments of the present invention.

FIG. 10 illustrates exemplary operations 1000 for generating such s-parameters according to embodiments of the present invention. An aperiodic cross-correlation function of a spreading sequence is calculated (Block 1010). Multiple x-parameter vectors as described in equation (21) are then calculated from the aperiodic cross-correlation function of the spreading sequence, a channel estimate, and G-RAKE correlation times (Block 1020). Inner products of the x-parameter vectors and the G-RAKE weighting factors are then determined to generate s-parameters (Block 1030).

Figure 11:
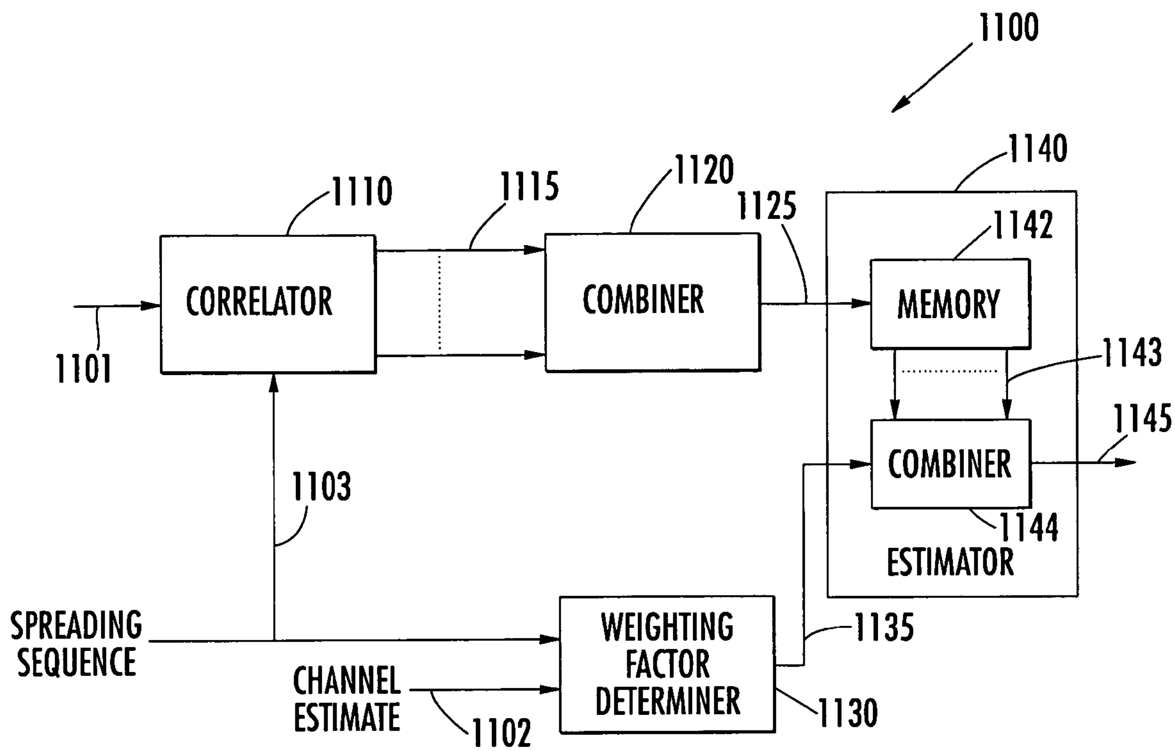
FIG. 11 is a schematic diagram illustrating a receiver according to yet other embodiments of the present invention.

FIG. 11 illustrates an apparatus 1100, according to still other embodiments of the present invention, for decoding a communications signal 1101 that represents a symbol sequence encoded according to a spreading sequence. A correlator 1110 generates time offset correlations 1115 of the communications signal 1101 with a spreading sequence 1103. A combiner 1120, e.g., a RAKE combiner, combines the plurality of time-offset correlations 1115 to generate first estimates 1125, e.g., decision statistics, for symbols. An estimator 1140 generates second estimates 1145 for the symbols based on ISI factors, here a plurality of weighting factors 1135 generated by weighting factor determiner circuit 1130 based on knowledge of the symbol-dependence of the spreading sequence 1103, i.e., such that the weighting factors 1135 include a relationship between portions of the spreading sequence 1103. For example, the weighting factors 1135 may be generated based on knowledge of the spreading code 1103 and a channel estimate 1102.

The estimator 1140 may be viewed as providing a form of linear equalization. The estimator 1140 includes a memory 1142, such as a tapped delay line, that stores initial symbol estimates 1143 (e.g., decision statistics) for a plurality of symbols (e.g., a series of successive symbols). A combiner 1144 combines the stored initial estimates 1143 according to the weighting factors 1135 produced by the weighting factor determiner 1130 to generate revised estimates 1145 for the symbols. For example, for a series of symbols S1, S2, S3, initial symbol estimates for the symbols S1, S2, S3 may be used to generate a revised estimate for symbol S2.

Figure 12:
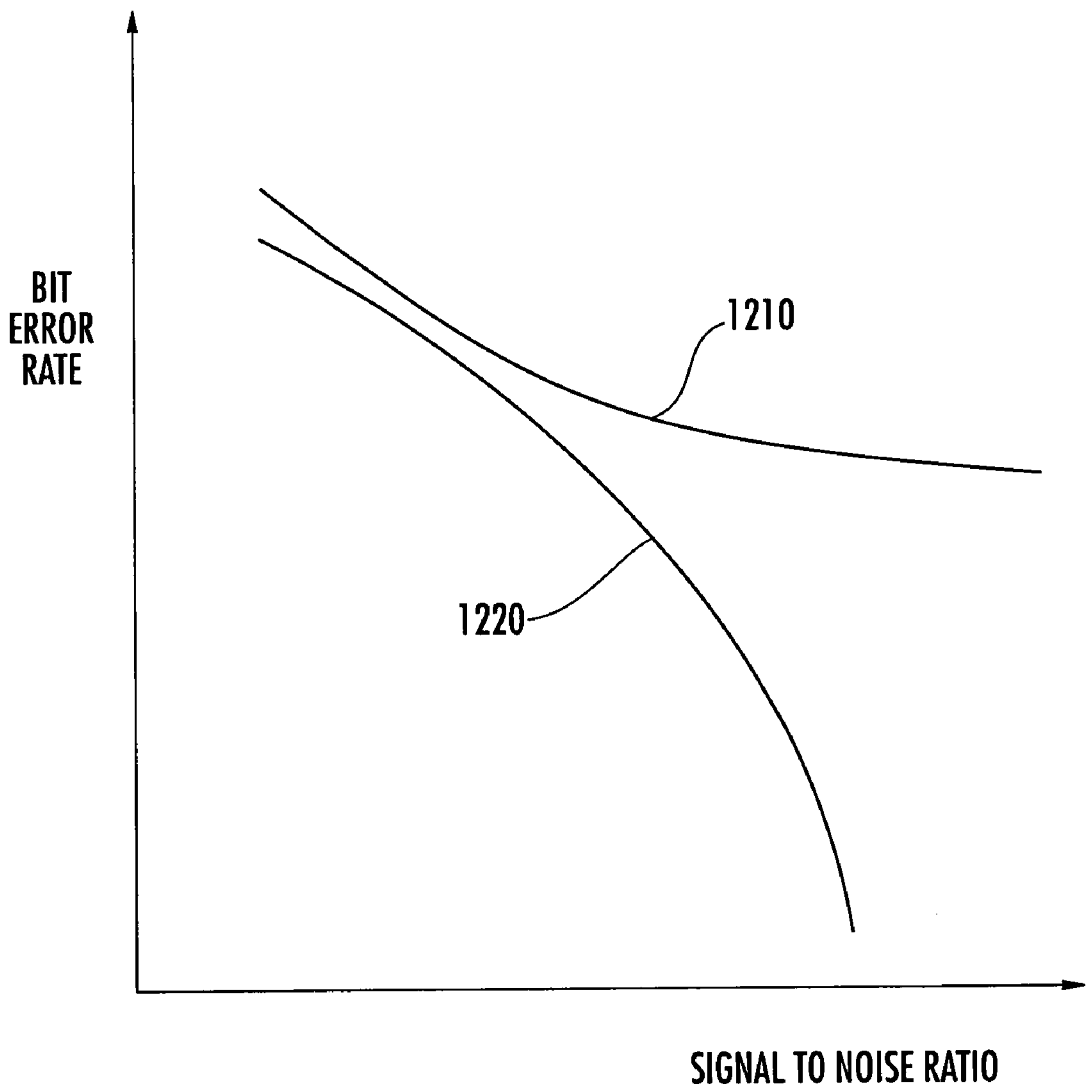
FIG. 12 is a chart illustrating potential performance of a conventional receiver in comparison to potential performance of a receiver according to embodiments of the present invention.

FIG. 12 illustrates a potential performance characteristic 1210 of a conventional receiver in comparison to a potential performance characteristic 1220 of a receiver according to embodiments of the present invention. As can be seen in FIG. 12, a receiver according to embodiments of the present invention may provide improved bit error rate, and more particularly, significantly improved bit error rate for higher signal to noise ratio conditions.

It will be appreciated that the present invention may be operated with multiple receive antennas, as are commonly found in cellular base stations. For such embodiments of the present invention, the first symbol estimates, as well as the s-parameters, described above may contain terms corresponding to different antennas.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of decoding a communications signal representing symbols encoded according to respective portions of a spreading sequence, the method comprising:

generating time-offset correlations of the communications signal with the spreading sequence;

combining the time-offset correlations to generate first estimates for the symbols;

determining intersymbol interference factors that include a relationship among different portions of the spreading sequence; and generating a second estimate for one of the symbols from the first estimates based on the determined intersymbol interference factors.

2. A method according to claim 1, wherein an intersymbol interference factors include a relationship between a first portion of the spreading sequence associated with the one symbol to a second portion of the spreading sequence associated with another symbol.

3. A method according to claim 1, wherein generating a second estimate for one of the symbols from the first estimates based on the determined intersymbol interference factors comprises generating the second estimate from the first estimates using a sequence estimation procedure that employs a branch metric that is a function of the determined intersymbol interference factors.

4. A method according to claim 1, wherein determining intersymbol interference factors comprises determining the intersymbol interference factors from the spreading sequence and a channel estimate for a channel over which the communications signal is communicated.

5. A method according to claim 4, further comprising generating the channel estimate from a communications signal.

6. A method according to claim 4, wherein determining the intersymbol interference factors from the spreading sequence and a channel estimate comprises determining an intersymbol interference factor from the channel estimate and a cross correlation of portions of the spreading sequence.

7. A method according to claim 4:

wherein the channel estimate comprises a channel impulse response and a chip pulse shape function; and wherein determining the intersymbol interference factors from the spreading sequence and a channel estimate comprises determining the intersymbol interference factors from the channel impulse response, the chip pulse shape function, and the spreading sequence.

8. A method according to claim 4:

where the channel estimate comprises a plurality of correlation times, an associated plurality of channel coefficients and a chip pulse shape function;

wherein generating time-offset correlations comprises correlating the communications signal with the spreading sequence at the plurality of correlation times to produce a plurality of time-offset correlations;

wherein combining the time-offset correlations is preceded by determining a plurality of weighting factors from the plurality of channel coefficients;

wherein combining the time-offset correlations comprises combining the plurality of time-offset correlations according to the determined plurality of weighting factors to generate one of the first estimates; and wherein determining the intersymbol interference factors from the spreading sequence and a channel estimate comprises determining an intersymbol interference factor from the plurality of correlation times, the plurality of channel coefficients, the chip pulse shape function, the determined plurality of weighting factors and the spreading sequence.

9. A method according to claim 8, wherein determining a plurality of weighting factors from the plurality of channel coefficients comprises determining the plurality of weighting factors from the plurality of channel coefficients and knowledge of an interfering component of the communications signal.

10. A method according to claim 9, wherein determining the plurality of weighting factors from the plurality of channel coefficients and knowledge of an interfering component of the communications signal comprises determining the plurality of weighting factors from the plurality of channel coefficients and a noise correlation estimate.

11. A method according to claim 4, wherein generating a second estimate for one of the symbols from the first estimates based on the determined intersymbol interference factors comprises generating the second estimate from the first estimates using a sequence estimation procedure that employs a branch metric that is a function of the determined intersymbol interference factors.

12. A method according to claim 1, wherein the first estimates comprise decision statistics and wherein the second estimate comprises a sequence estimate.

13. A method according to claim 1, wherein generating a second estimate for one of the symbols from the first estimates based on the determined intersymbol interference factors comprises:

determining a number of states from an estimate of a channel over which the communications signal is communicated and a spreading factor and symbol modulation applied in generating the communications signal; and generating the second estimate using a sequence estimation procedure over the determined number of states.

14. A method according to claim 13, further comprising the step of generating the channel estimate from a communications signal.

15. A method according to claim 13, wherein the determined number of states is constrained to a finite set of values.

16. A method according to claim 1, wherein generating a second estimate for one of the symbols from the first estimates based on the determined intersymbol interference factors comprises:

selecting, based on an estimate of a channel over which the communications signal is communicated and a spreading factor applied in generating the communications signal, a number of states from a group consisting of one and the order of a modulation constellation applied to the communications signal raised to a power greater than zero; and generating the second estimate from the first estimates using a sequence estimation procedure over the determined number of states.

17. A method according to claim 1, wherein generating a second estimate for one of the symbols from the first estimates based on the determined intersymbol interference factors comprises generating the second estimate from the first estimates using a sequence estimation procedure selected from a group comprising a maximum likelihood sequence estimation (MLSE) procedure, a decision feedback sequence estimation (DFSE) procedure, a decision feedback equalization (DFE) procedure, and a reduced state sequence estimation (RSSE) procedure.

18. A method according to claim 17, wherein generating the second estimate from the first estimates using a sequence estimation procedure selected from a group comprising a maximum likelihood sequence estimation (MLSE) procedure, a decision feedback sequence estimation (DFSE) procedure, a decision feedback equalization (DFE) procedure, and a reduced state sequence estimation (RSSE) procedure comprises selecting the selected sequence estimation procedure based on an estimate of a channel over which the communications signal is communicated and a spreading factor applied in generating the communications signal.

19. A method according to claim 1:

wherein generating time-offset correlations of the communications signal with the spreading sequence comprises generating multiple pluralities of time-offset correlations of the communications signal with the spreading sequence;

wherein combining the plurality of time-offset correlations to generate first estimates for the symbols comprises combining respective ones of the multiple pluralities of time-offset correlations to generate respective ones of the first estimates;

wherein determining intersymbol interference factors that include a relationship among different portions of the spreading sequence comprises generating a plurality of weighting factors that include a relationship among different portions of the spreading sequence; and wherein generating a second estimate for the symbol from the first estimates based on the determined intersymbol interference factors comprises combining the first estimates according to the determined weighting factors to generate the second estimate.

20. A method of decoding a communications signal representing symbols encoded according to respective portions of a spreading sequence, the method comprising:

generating a plurality of time-offset correlations of the communications signal with the spreading sequence;

combining the plurality of time-offset correlations to generate a first estimate for one of the symbols of the sequence of symbols;

determining an intersymbol interference factor that includes a relationship among different portions of the spreading sequence; and generating a second estimate for the one symbol from the first estimate based on the determined intersymbol interference factor.

21. A method according to claim 20, wherein the intersymbol interference factor includes a relationship between a first portion of the spreading sequence associated with the one symbol to a second portion of the spreading sequence associated with another symbol.

22. A method according to claim 20, wherein generating a second estimate for the one symbol from the first estimate based on the determined intersymbol interference factor comprises generating the second estimate from the first estimate using a sequence estimation procedure that employs a branch metric that is a function of the determined intersymbol interference factor.

23. A method according to claim 20, wherein determining an intersymbol interference factor comprises determining the intersymbol interference factor from the spreading sequence and a channel estimate for a channel over which the communications signal is communicated.

24. A method according to claim 23, wherein determining the intersymbol interference factor from the spreading sequence and a channel estimate comprises determining the intersymbol interference factor from the channel estimate and a cross correlation of portions of the spreading sequence.

25. A method of decoding a communications signal representing symbols encoded according to a spreading sequence, the method comprising:

generating time-offset correlations of the communications signal with the spreading sequence;

determining weighting factors from a channel estimate for a channel over which the communications signal is communicated and knowledge of an interfering component of the communications signal;

combining the time-offset correlations according to the determined weighting factors to generate first estimates for a symbol;

determining an intersymbol interference factor from the spreading sequence; and generating a second estimate for one of the symbols from the first estimates based on the determined intersymbol interference factors.

26. A method according to claim 25, wherein generating a second estimate for one of the symbols from the first estimates based on the determined intersymbol interference factors comprises generating the second estimate from the first estimates using a sequence estimation procedure that employs a branch metric that is a function of the determined intersymbol interference factor.

27. A method according to claim 25, wherein the symbols comprise a sequence of symbols having a symbol period, and wherein the spreading sequence has a period that is greater than the symbol period.

28. A method according to claim 27, wherein an intersymbol interference factor includes a relationship among different portions of the spreading sequence.

29. A method according to claim 28, wherein determining an intersymbol interference factor that includes a relationship among different portions of the spreading sequence comprises determining an intersymbol interference factor from a channel estimate for a channel over which the communications signal is communicated and a cross-correlation of portions of the spreading sequence.

30. A method according to claim 27:

where the channel estimate comprises a plurality of correlation times, an associated plurality of channel coefficients and a chip pulse shape function;

wherein generating time-offset correlations comprises correlating the communications signal with the spreading sequence at the plurality of correlation times to produce a plurality of time-offset correlations;

wherein determining a plurality of weighting factors from a channel estimate for a channel over which the communications signal is communicated and knowledge of an interfering component of the communications signal comprises determining the plurality of weighting factors from the plurality of channel coefficients and from knowledge of an interfering spread spectrum signal; and wherein determining an intersymbol interference factor from the spreading sequence comprises determining an intersymbol interference factor from the plurality of correlation times, the plurality of channel coefficients, the chip pulse shape function, the determined plurality of weighting factors and the spreading sequence.

31. A method according to claim 27, wherein generating a second estimate for one of the symbols from the first estimate based on the determined intersymbol interference factors comprises generating the second estimate from the first estimates using a sequence estimation procedure that employs a branch metric that is a function of the determined intersymbol interference factors.

32. An apparatus for decoding a communications signal representing symbols encoded according to respective portions of a spreading sequence, the apparatus comprising:

a correlator circuit operative to generate time-offset correlations of the communications signal with the spreading sequence;

a combiner circuit operative to combine the time-offset correlations to generate first estimates for the symbols;

an intersymbol interference factor determiner circuit operative to determine intersymbol interference factors that include a relationship among different portions of the spreading sequence; and an estimator circuit that generates a second estimate for one of the symbols from the first estimates based on the determined intersymbol interference factors.

33. An apparatus according to claim 32, wherein the intersymbol interference factors include a relationship between a first portion of the spreading sequence associated with the one symbol to a second portion of the spreading sequence associated with another symbol.

34. An apparatus according to claim 32, wherein the estimator circuit comprises a sequence estimator circuit that generates the second estimate from the first estimates using a sequence estimation procedure that employs a branch metric that is a function of the determined intersymbol interference factors.

35. An apparatus according to claim 32, wherein the intersymbol interference factor determiner circuit is operative to determine the intersymbol interference factors from the spreading sequence and a channel estimate for a channel over which the communications signal is communicated.

36. An apparatus according to claim 35, further comprising a channel estimator circuit that generates the channel estimate from a communications signal.

37. An apparatus according to claim 35, wherein intersymbol interference factor determiner circuit is operative to determine the intersymbol interference factors from the channel estimate and a cross correlation of portions of the spreading sequence.

38. An apparatus according to claim 35:

wherein the channel estimate comprises a channel impulse response and a chip pulse shape function; and wherein the intersymbol interference factor determiner circuit is operative to determine the intersymbol interference factors from the channel impulse response, the chip pulse shape function, and the spreading sequence.

39. An apparatus according to claim 35:

where the channel estimate comprises a plurality of correlation times, an associated plurality of channel coefficients and a chip pulse shape function;

wherein the correlator circuit is operative to correlate the communications signal with the spreading sequence at the plurality of correlation times to produce a plurality of time-offset correlations;

wherein the apparatus further comprises a weighting factor determiner circuit that determines a plurality of weighting factors from the plurality of channel coefficients;

wherein the combiner circuit is operative to combine the plurality of time-offset correlations according to the determined plurality of weighting factors to generate one of the first estimates; and wherein the intersymbol interference factor determiner circuit is operative to determine one of the intersymbol interference factors from the plurality of correlation times, the plurality of channel coefficients, the chip pulse shape function, the determined plurality of weighting factors and the spreading sequence.

40. An apparatus according to claim 39, wherein the weighting factor determiner circuit is operative to determine the plurality of weighting factors from the plurality of channel coefficients and knowledge of an interfering component of the communications signal.

41. An apparatus according to claim 35, wherein the weighting factor determiner circuit is operative to determine the plurality of weighting factors from the plurality of channel coefficients and a noise correlation estimate.

42. An apparatus according to claim 35, wherein the estimator circuit comprises a sequence estimator that generates the second estimate from the first estimates using a sequence estimation procedure that employs a branch metric that is a function of the determined intersymbol interference factors.

43. An apparatus according to claim 32, wherein the first estimates comprise decision statistics and wherein the second estimate comprises a sequence estimate.

44. An apparatus according to claim 32, wherein the estimator circuit is operative to determine a number of states from an estimate of a channel over which the communications signal is communicated and a spreading factor and symbol modulation applied in generating the communications signal and to generate the second estimate using a sequence estimation procedure over the determined number of states.

45. An apparatus according to claim 44, wherein the determined number of states is constrained to a finite set of values.

46. An apparatus according to claim 32, wherein the estimator circuit is operative to select, based on an estimate of a channel over which the communications signal is communicated and a spreading factor applied in generating the communications signal, a number of states from a group consisting of one and the order of a modulation constellation applied to the communications signal raised to a power greater than zero and to generate the second estimate from the first estimates using a sequence estimation procedure over the determined number of states.

47. An apparatus according to claim 32, wherein the estimator circuit is operative to generate the second estimate from the first estimates using a sequence estimation procedure selected from a group comprising a maximum likelihood sequence estimation (MLSE) procedure, a decision feedback sequence estimation (DFSE) procedure, a decision feedback equalization (DFE) procedure, and a reduced state sequence estimation (RSSE) procedure.

48. An apparatus according to claim 47, wherein the estimator circuit is operative to select the selected sequence estimation procedure based on an estimate of a channel over which the communications signal is communicated and a spreading factor applied in generating the communications signal.

49. An apparatus according to claim 32:

wherein the correlator circuit is operative to generate multiple pluralities of time-offset correlations of the communications signal with the spreading sequence;

wherein the combiner circuit comprises a first combiner circuit operative to combine respective ones of the multiple pluralities of time-offset correlations to generate respective ones of the first estimates;

wherein the intersymbol interference factor determiner circuit is operative to generate a plurality of weighting factors that include a relationship among different portions of the spreading sequence; and wherein the estimator circuit comprises:

a memory circuit that stores the first estimates; and a second combiner circuit that combines the stored first estimates according to the determined weighting factors to generate the second estimate.

50. An apparatus for decoding a communications signal representing symbols encoded according to respective portions of a spreading sequence, the apparatus comprising:

a correlator circuit operative to generate a plurality of time-offset correlations of the communications signal with the spreading sequence;

a combiner circuit operative to combine the plurality of time-offset correlations to generate a first estimate for one of the symbols of the sequence of symbols;

an intersymbol interference factor determiner circuit operative to determine an intersymbol interference factor that includes a relationship among different portions of the spreading sequence; and an estimator circuit operative to generate a second estimate for the one symbol from the first estimate based on the determined intersymbol interference factor.

51. An apparatus according to claim 50, wherein the intersymbol interference factor includes a relationship between a first portion of the spreading sequence associated with the one symbol to a second portion of the spreading sequence associated with another symbol.

52. An apparatus according to claim 50, wherein the estimator circuit is operative to generate the second estimate from the first estimate using a sequence estimation procedure that employs a branch metric that is a function of the determined intersymbol interference factor.

53. An apparatus according to claim 50, wherein the intersymbol interference factor determiner circuit is operative to determine the intersymbol interference factor from the spreading sequence and a channel estimate for a channel over which the communications signal is communicated.

54. An apparatus according to claim 53, the intersymbol interference factor determiner circuit is operative to determine the intersymbol interference factor from the channel estimate and a cross correlation of portions of the spreading sequence.

55. An apparatus for decoding a communications signal representing symbols encoded according to a spreading sequence, the apparatus comprising:

a correlator circuit operative to generate time-offset correlations of the communications signal with the spreading sequence;

a weighting factor determiner circuit operative to determine weighting factors from a channel estimate for a channel over which the communications signal is communicated and knowledge of an interfering component of the communications signal;

a combiner circuit operative to combine the time-offset correlations according to the determined weighting factors to generate first estimates for the symbols;

an intersymbol interference factor determiner circuit that determines intersymbol interference factors from the spreading sequence; and an estimator circuit that generates a second estimate for one of the symbols from the first estimates based on the determined intersymbol interference factors.

56. An apparatus according to claim 55, wherein the estimator circuit comprises a sequence estimator circuit that generates the second estimate from the first estimates using a sequence estimation procedure that employs a branch metric that is a function of the determined intersymbol interference factors.

57. An apparatus according to claim 55, wherein the symbols comprises a sequence of symbols having a symbol period, and wherein the spreading sequence has a period that is greater than the symbol period.

58. An apparatus according to claim 57, wherein an intersymbol interference factor includes a relationship among different portions of the spreading sequence.

59. An apparatus according to claim 57, wherein the intersymbol interference factor determiner circuit is operative to determine an intersymbol interference factor from a channel estimate for a channel over which the communications signal is communicated and a cross-correlation of portions of the spreading sequence.

60. An apparatus according to claim 57:

wherein the channel estimate comprises a plurality of correlation times, an associated plurality of channel coefficients and a chip pulse shape function;

wherein the correlator circuit is operative to correlate the communications signal with the spreading sequence at the plurality of correlation times to produce the plurality of time-offset correlations;

wherein the weighting factor determiner circuit is operative to determine a plurality of weighting factors from the plurality of channel coefficients and from knowledge of an interfering spread spectrum signal; and wherein the intersymbol interference factor determiner circuit is operative to determine an intersymbol interference factor from the plurality of correlation times, the plurality of channel coefficients, the chip pulse shape function, the determined plurality of weighting factors and the spreading sequence.

61. An apparatus according to claim 57, wherein the estimator circuit comprises a sequence estimator circuit operative to generate the second estimate from the first estimates using a sequence estimation procedure that employs a branch metric that is a function of the determined intersymbol interference factors.

62. An apparatus for decoding a communications signal representing symbols encoded according to respective portions of a spreading sequence, the apparatus comprising:

means for generating time-offset correlations of the communications signal with the spreading sequence;

means for combining the time-offset correlations to generate first estimates for the symbols;

means for determining intersymbol interference factors that include a relationship among different portions of the spreading sequence; and means for generating a second estimate for one of the symbols from the first estimates based on the determined intersymbol interference factor.

63. An apparatus according to claim 62, wherein the intersymbol interference factors include a relationship between a first portion of the spreading sequence associated with the one symbol to a second portion of the spreading sequence associated with another symbol.

64. An apparatus according to claim 62, wherein the means for generating a second estimate comprises means for generating the second estimate from the first estimates using a sequence estimation procedure that employs a branch metric that is a function of the determined intersymbol interference factors.

65. An apparatus according to claim 62, wherein the means for determining intersymbol interference factors comprises means for determining the intersymbol interference factors from the spreading sequence and a channel estimate for a channel over which the communications signal is communicated.

66. An apparatus according to claim 65:

where the channel estimate comprises a plurality of correlation times, an associated plurality of channel coefficients and a chip pulse shape function;

wherein the means for generating time-offset correlations comprises means for correlating the communications signal with the spreading sequence at a plurality of correlation times to produce a plurality of time-offset correlations;

wherein the apparatus further comprises means for determining a plurality of weighting factors from the plurality of channel coefficients;

wherein the means for combining the time-offset correlations comprises means for combining the plurality of time-offset correlations according to the determined plurality of weighting factors to generate one of the first estimates; and wherein the means for determining the intersymbol interference factors from the spreading sequence and a channel estimate comprises means for determining an intersymbol interference factor from the plurality of correlation times, the plurality of channel coefficients, the chip pulse shape function, the determined plurality of weighting factors and the spreading sequence.

67. An apparatus according to claim 62, wherein the means for generating a second estimate comprises:

means for determining a number of states from an estimate of a channel over which the communications signal is communicated and a spreading factor and symbol modulation applied in generating the communications signal; and means for generating the second estimate using a sequence estimation procedure over the determined number of states.

68. An apparatus for decoding a communications signal representing symbols encoded according to a spreading sequence, the apparatus comprising:

means for generating time-offset correlations of the communications signal with the spreading sequence;

means for determining weighting factors from a channel estimate for a channel over which the communications signal is communicated and knowledge of an interfering component of the communications signal;

means for combining the time-offset correlations according to the determined weighting factors to generate first estimates for the symbols;

means for determining intersymbol interference factors from the spreading sequence; and means for generating a second estimate for one of the symbols from the first estimate based on the determined intersymbol interference factors.

69. An apparatus according to claim 68, wherein the means for generating a second estimate comprises means for generating the second estimate from the first estimates using a sequence estimation procedure that employs a branch metric that is a function of the determined intersymbol interference factors.

70. An apparatus according to claim 68, wherein the symbols comprise a sequence of symbols having a symbol period, and wherein the spreading sequence has a period that is greater than the symbol period.

71. An apparatus according to claim 70, wherein an intersymbol interference factor includes a relationship among different portions of the spreading sequence.

72. A receiver, comprising:

a processor circuit operative to receive a communications signal representing symbols encoded according to respective portions of a spreading sequence and to generate a baseband signal from the received communications signal;

a correlator circuit operative to generate time-offset correlations of the baseband signal with the spreading sequence;

a combiner circuit operative to combine the time-offset correlations to generate first estimates for the symbols;

a intersymbol interference factor determiner circuit operative to determine intersymbol interference factors that include a relationship among different portions of the spreading sequence; and an estimator circuit operative to generate a second estimate for the symbol from the first estimates based on the determined intersymbol interference factors.

73. A receiver according to claim 72, wherein the communications signal comprises a radio signal, and wherein the processor circuit comprises a radio processor circuit operative to receive the radio signal and to generate the baseband signal therefrom.

74. A receiver, comprising:

a processor circuit operative to receive a communications signal representing symbols encoded according to a spreading sequence and to generate a baseband signal therefrom;

a correlator circuit operative to generate time-offset correlations of the baseband signal with the spreading sequence;

a weighting factor determiner circuit operative to determine weighting factors from a channel estimate for a channel over which the communications signal is communicated and knowledge of an interfering component of the communications signal;

a combiner circuit operative to combine the time-offset correlations according to the determined weighting factors to generate first estimates for the symbols;

an intersymbol interference factor determiner circuit operative to determine intersymbol interference factors from the spreading sequence; and an estimator circuit operative to generate a second estimate for one of the symbols from the first estimates based on the determined intersymbol interference factors.

75. A receiver according to claim 74, wherein the communications signal comprises a radio signal, and wherein the processor circuit comprises a radio processor circuit operative to receive the radio signal and to generate the baseband signal therefrom.

* * * * *